United States Patent
Hou

(10) Patent No.: US 9,946,359 B2
(45) Date of Patent: Apr. 17, 2018

(54) THIN KEYBOARD STRUCTURE AND ITS KEYCAP

(71) Applicant: Chicony Electronics Co., Ltd., New Taipei (TW)

(72) Inventor: Po-Chun Hou, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 15/249,491

(22) Filed: Aug. 29, 2016

(65) Prior Publication Data

US 2017/0097688 A1   Apr. 6, 2017

(30) Foreign Application Priority Data

Oct. 2, 2015  (TW) .............................. 104215865 A

(51) Int. Cl.
*G06F 3/02*   (2006.01)
*H01H 13/70*  (2006.01)

(52) U.S. Cl.
CPC ........... *G06F 3/0202* (2013.01); *H01H 13/70* (2013.01)

(58) Field of Classification Search
CPC .............................. G06F 3/0202; H01H 13/70
See application file for complete search history.

(56) References Cited

U.S. PATENT DOCUMENTS

| | | | | |
|---|---|---|---|---|
| 6,958,458 B1* | 10/2005 | Tsai | ...................... | H01H 3/125 200/344 |
| 2008/0121507 A1* | 5/2008 | Chen | ..................... | H01H 3/125 200/344 |
| 2010/0140071 A1* | 6/2010 | Wang | ................... | H01H 13/705 200/344 |
| 2010/0259482 A1* | 10/2010 | Ball | ..................... | G06F 3/0219 345/168 |
| 2011/0073455 A1* | 3/2011 | Cheng | ................... | H01H 3/125 200/5 A |
| 2011/0108401 A1* | 5/2011 | Yamada | ................. | H01H 3/125 200/302.1 |
| 2015/0101916 A1* | 4/2015 | Chen | ..................... | H01H 3/125 200/5 A |

FOREIGN PATENT DOCUMENTS

TW           M356963 U1    5/2009

* cited by examiner

*Primary Examiner* — Premal R Patel
(74) *Attorney, Agent, or Firm* — CKC & Partners Co., Ltd.

(57) ABSTRACT

A key cap includes a cap body having a bottom surface, and at least one pivot retainer protrusively disposed on the bottom surface of the cap body. The pivot retainer includes a position-limiting portion, two lateral portions and a shaft-received recess. The lateral portions are connected to the same side of the position-limiting portion, and the shaft-received recess is disposed in the position-limiting portion, and is located between the two lateral portions.

21 Claims, 6 Drawing Sheets

THIN KEYBOARD STRUCTURE AND ITS KEYCAP

RELATED APPLICATIONS

This application claims priority to Taiwan Application Serial Number 104215865, filed Oct. 2,2015, which is herein incorporated by reference.

BACKGROUND

Field of Disclosure

The present disclosure relates to a keyboard. More particularly, the present disclosure relates to a thin keyboard structure and its keycap.

Description of Related Art

A keyboard is an essential part of a computer device for a user to input information to the computer device. In general, a conventional keyboard includes a key cap, a base board and a linking mechanism in which one end of the linking mechanism is pivotally connected to a pivot buckle disposed at one of corners of the key cap, and the other end of the linking mechanism is movably connected to the base board, thereby allowing the linking mechanism to vertically move along with the key cap.

However, if the connection between the linking mechanism and the key cap is weak, the coupling strength between the linking mechanism and the key cap is insufficient. Thus, the key cap will be detached easily from the keyboard when one corner of the key cap is pulled or lifted up by an external force, thus resulting in inconvenient use of the keyboard.

Therefore, how to provide a solution to effectively overcome the aforementioned inconvenience and shortages and to increase industrial competitiveness for those in this field becomes an important topic.

SUMMARY

An aspect of the disclosure is to provide a thin keyboard structure and its keycap to overcome the defects and inconvenience of the prior art.

According to one embodiment, the thin keyboard structure includes a base board, a key cap and a linking mechanism. The key cap includes a cap body having a bottom surface facing towards the base board, and at least one pivot retainer protrusively disposed on the bottom surface of the cap body. The pivot retainer includes a position-limiting portion, two lateral portions respectively connected to the same side of the position-limiting portion, and a shaft-received recess one portion of which is disposed in the position-limiting portion and the other portion of which is disposed between the lateral portions. The linking mechanism is elevatably connected to the base board and the key cap, thereby guiding the key cap. The linking mechanism is provided with a first connecting member one end of which has at least one pivotal shaft, and the pivotal shaft is pivotally disposed in the shaft-received recess, and is confined by the position-limiting portion.

Therefore, in this embodiment, because being confined by the position-limiting portion, the pivotal shaft will not easily escape the shaft-received recess between the lateral portions, thereby enabling the key cap not to be separated from the linking mechanism easily, thus further decreasing the possibilities of the key cap being unexpectedly detached from the keyboard.

In one or more embodiments of the present disclosure, the pivot retainer further includes two first guiding inclined surfaces respectively disposed on the lateral portions. The first guiding inclined surfaces are connected to the shaft-received recess for guiding the pivotal shaft into the shaft-received recess.

In one or more embodiments of the present disclosure, the pivot retainer further includes a second guiding inclined surface disposed on the position-limiting portion. The second guiding inclined surface is connected to the first guiding inclined surfaces and the shaft-received recess. When the first connecting member is engaged with the key cap, the pivotal shaft or the pivot retainer is elastically deformed by the pivotal shaft and the second guiding inclined surface that push each other so that the pivotal shaft can be guided into the shaft-received recess.

In one or more embodiments of the present disclosure, a slope of at least one of the first guiding inclined surfaces and the second guiding inclined surface is 40° to 45°.

In one or more embodiments of the present disclosure, an orthographic projection of one end surface of the pivotal shaft onto the cap body overlapped with an orthographic projection of the second guiding inclined surface onto the cap body.

In one or more embodiments of the present disclosure, each of the lateral portions is concavely formed with a concave cambered surface. The concave cambered surfaces of the lateral portions face each other, and are respectively connected to the position-limiting portion so as to define the other portion of the shaft-received recess.

In one or more embodiments of the present disclosure, the shaft-received recess is directly connected to the bottom surface of the cap body through the pivot retainer.

In one or more embodiments of the present disclosure, a length of the pivotal shaft ranges between a width of each of the lateral portions and a length of the shaft-received recess.

In one or more embodiments of the present disclosure, a ratio of a width of the position-limiting portion to a width of each of the lateral portions is approximate to 3:8.

In one or more embodiments of the present disclosure, the number of the at least one pivotal shaft is two, and the number of the at least one pivot retainer is two. The pivotal shafts extending in two opposite directions are both formed on the end of the first connecting member. The pivotal shafts respectively extend into the shaft-received recesses of the pivot retainers so that the end of the first connecting member is directly clamped between the pivot retainers.

In one or more embodiments of the present disclosure, the key cap further includes at least one sliding slot retainer disposed on the bottom surface of the cap body. The linking mechanism is further provided with a second connecting member, one end of which has at least one sliding shaft. The sliding shaft is slidably received in the sliding slot retainer.

In one or more embodiments of the present disclosure, the base board is provided with at least one first coupling piece and at least one second coupling piece. One end of the first connecting member opposite to the pivotal shafts is slidably connected to the first coupling piece, and one end of the second connecting member opposite to the sliding shaft is pivotally connected to the second coupling piece.

In one or more embodiments of the present disclosure, the first connecting member and the second connecting member are pivotally connected to each other.

According to another embodiment, a key cap includes a cap body having a bottom surface, and at least one pivot retainer protrusively disposed on the bottom surface of the cap body. The pivot retainer includes a position-limiting portion, two lateral portions and a shaft-received recess. The lateral portions are connected to the same side of the position-limiting portion, and the shaft-received recess is disposed in the position-limiting portion, and is disposed between the lateral portions for receiving and confining a pivotal shaft of a linking mechanism.

It is to be understood that both the foregoing general description and the following detailed description are by examples, and are intended to provide further explanation of the disclosure as claimed.

BRIEF DESCRIPTION OF THE DRAWING

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
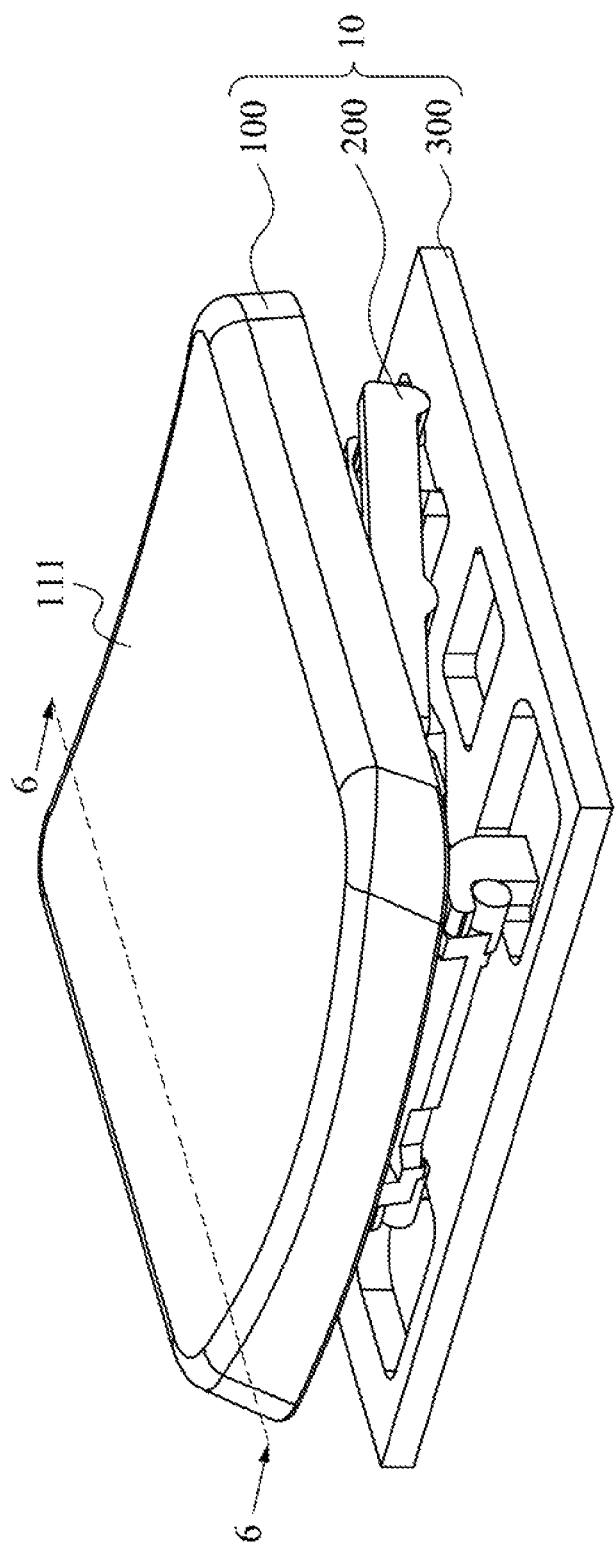
FIG. 1 is a perspective assembly view of a thin keyboard structure according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Figure 2:
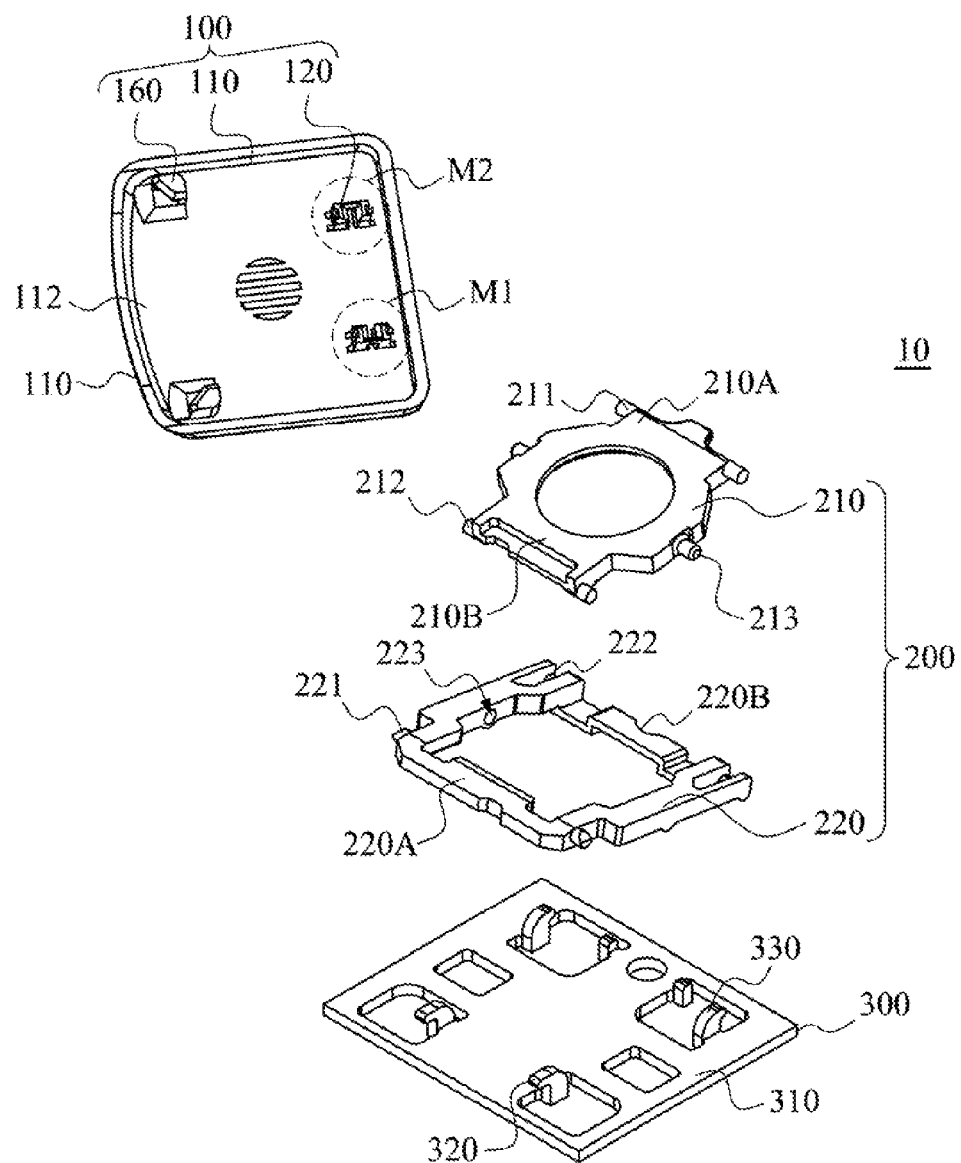
FIG. 2 is an exploded assembly view of FIG. 1.
Figure 3:
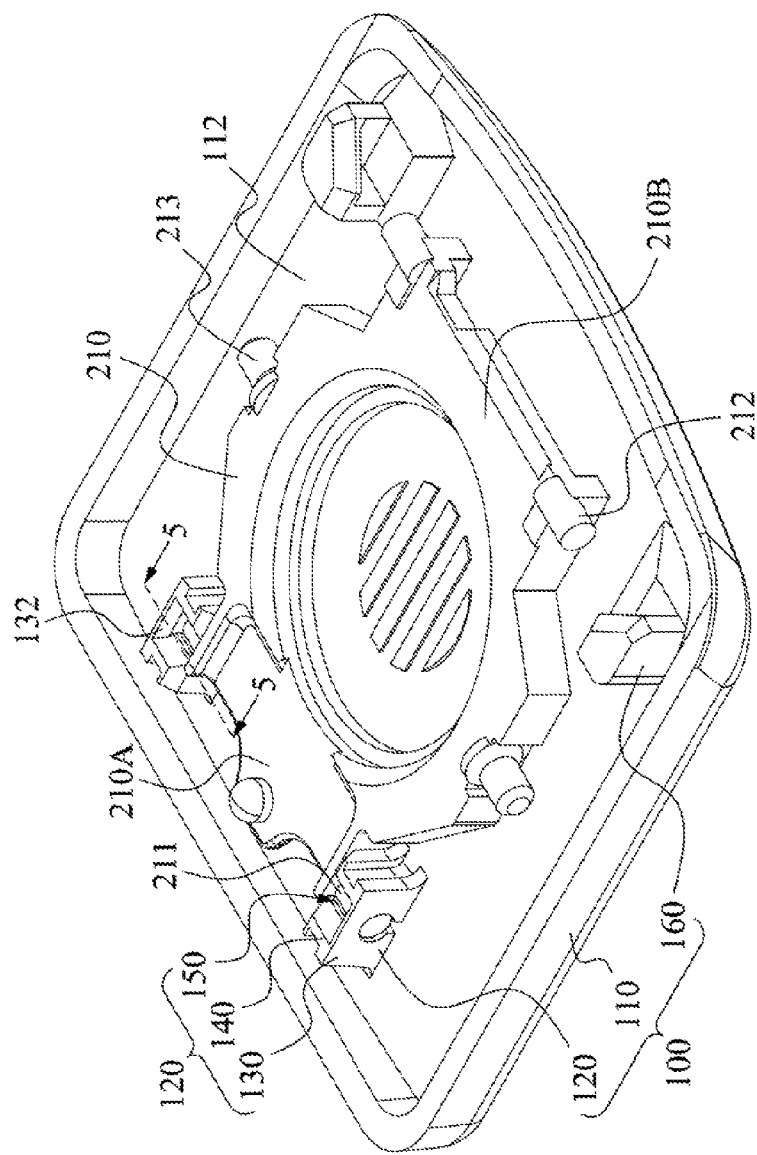
FIG. 3 is an assembly view of a combination of a key cap and a first connecting member of FIG. 2 viewed along another direction.
Figure 4:
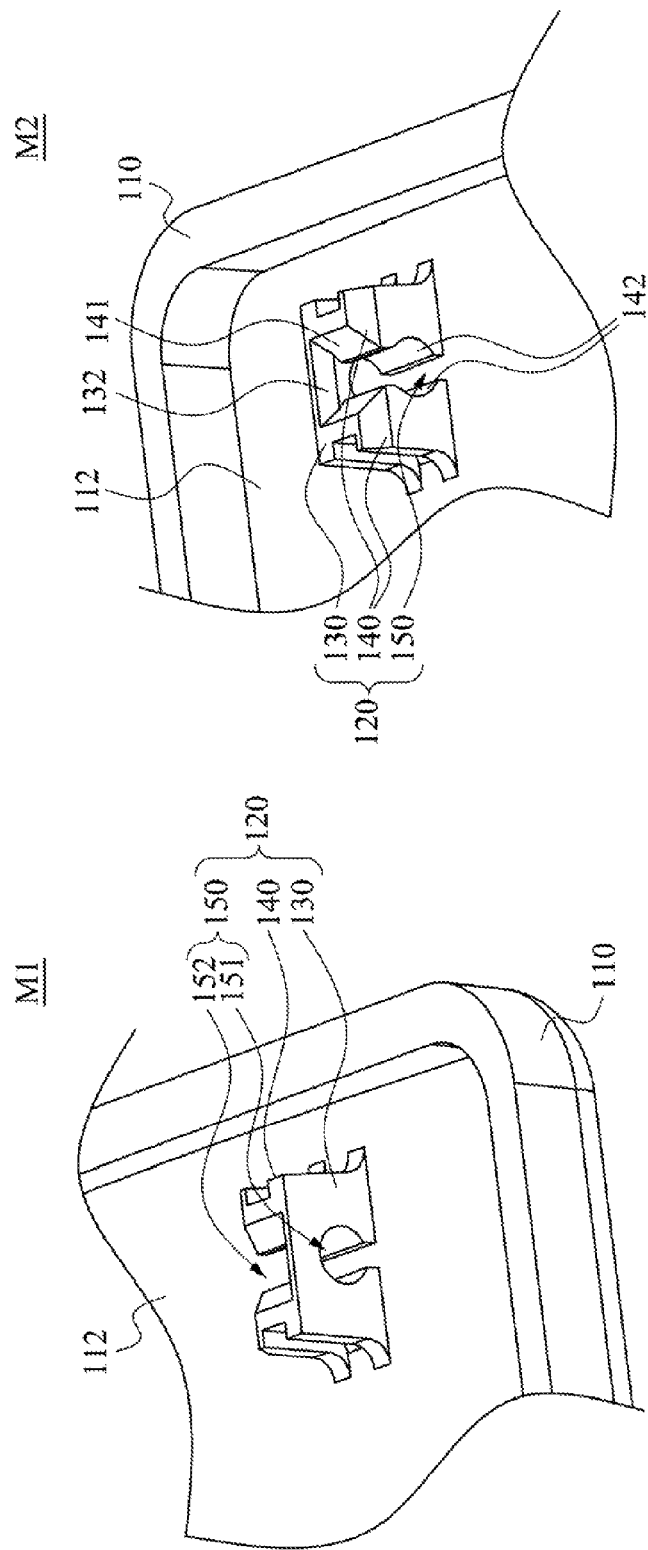
FIG. 4A is a partially enlarged view of an area M1 shown in FIG. 2.
FIG. 4B is a partially enlarged view of an area M2 shown in FIG. 2.

Reference is now made to FIG. 1 to FIG. 4A, in which FIG. 1 a perspective assembly view of a thin keyboard structure 10 according to one embodiment of the disclosure, FIG. 2 is an exploded assembly view of FIG. 1, FIG. 3 is an assembly view of a combination of a key cap 100 and a first connecting member 210 of FIG. 2 viewed along another direction, and FIG. 4A is a partially enlarged view of an area M1 shown in FIG. 2.

In the embodiment, the thin keyboard structure 10 includes a key cap 100, a linking mechanism 200, and a base board 300. The linking mechanism 200 is disposed between the base board 300 and the key cap 100, and the linking mechanism 200 is elevatably connected to the base board 300 and the key cap 100 so as to guide the key cap 100 for moving vertically. The key cap 100 includes a cap body 110 and two pivot retainers 120. The cap body 110 includes a press surface 111 and a bottom surface 112 facing towards the base board 300. The bottom surface 112 is opposite to the press surface 111, and face towards the base board 300. Each of the pivot retainers 120 is connected to the cap body 110, and each of the pivot retainers 120 is provided with a position-limiting portion 130, two lateral portions 140 and a shaft-received recess 150. The lateral portions 140 are respectively connected to the same side of the position-limiting portion 130, and one portion (e.g., referred to as a first portion 151 hereinafter) of the shaft-received recess 150 is disposed in the position-limiting portion 130, and the other portion (e.g., referred to as a second portion 152 hereinafter) of the shaft-received recess 150 is disposed between the lateral portions 140. The linking mechanism 200 at least further includes a first connecting member 210. The first connecting member 210 is provided with a first end 210A and a second end 210B opposite to the first end 210A. The first end 210A of the first connecting member 210 is formed with two first pivotal shafts 211 respectively extend in two opposite directions. The first pivotal shafts 211 are pivotally received in the shaft-received recesses 150, respectively, and each of the first pivotal shafts 211 is confined between the respective position-limiting portion 130 and the bottom surface 112 of the cap body 110.

Therefore, because each of the first pivotal shafts 211 of the first connecting member 210 is confined by the position-limiting portion 130, each of the first pivotal shafts 211 will not detached easily from the shaft-received recess 150 between the lateral portions 140, such that the key cap 100 can be secured on the first connecting member 210, so as to further decrease the possibilities of the key cap 100 of the key cap being unexpectedly detached from the keyboard when the key cap 100 is pulled or lifted up at one of corners of the cap body 110 by an external force.

Specifically, in the embodiment, referring to FIG. 2, the key cap 100 is further provided with two sliding slot retainers 160. The pivot retainers 120 and the sliding slot retainers 160 are protrusively disposed on the bottom surface 112 of the cap body 110 facing towards the base board 300. The pivot retainers 120 and the sliding slot retainers 160 are oppositely disposed on the bottom surface 112 of the cap body 110, and are adjacent to two opposite sides of the bottom surface 112 of the cap body 110, respectively. The base board 300 includes a main surface 310, two first coupling pieces 320 and two second coupling pieces 330. The first coupling pieces 320 and the second coupling pieces 330 are protrusively disposed on the main surface 310 of the base board 300, and the first coupling pieces 320 and the second coupling pieces 330 are oppositely disposed on the main surface 310 of the base board 300, and are adjacent to two opposite sides of the main surface 310 of the base board 300, respectively.

For example, each of the first coupling pieces 320 and each of the second coupling pieces 330 may be a hook, respectively. The second end 210B of the first connecting member 210 is provided with two second sliding shafts 212. The second sliding shafts 212 respectively extend in two opposite directions, and each of the second sliding shafts 212 is slidably connected to one of the first coupling pieces 320 of the base board 300. The linking mechanism 200 is further provided with a second connecting member 220. The second connecting member 220 is provided with a third end 220A and a fourth end 220B opposite to the third end 220A. The third end 220A of the second connecting member 220 is provided with two first sliding shafts 221. The first sliding shafts 221 respectively extend in two opposite directions, and each of the first sliding shafts 221 is slidably received in one of the sliding slot retainers 160. The fourth end 220B of the second connecting member 220 is provided with two rotation rods 222. Each of the rotation rods 222 is pivotally connected to one of the second coupling pieces 330 of the base board 300.

FIG. 4B is a partially enlarged view of an area M2 shown in FIG. 2. Referring to FIG. 3 and FIG. 4B, in the embodiment, each of the pivot retainers 120 further includes two first guiding inclined surfaces 141 and a second guiding inclined surface 132. The first guiding inclined surfaces 141 are respectively disposed on the lateral portions 140, and the first guiding inclined surfaces 141 are connected to the shaft-received recess 150 for guiding each of the first pivotal shafts 211 (FIG. 3) into the respective shaft-received recess 150. The second guiding inclined surface 132 is disposed on the position-limiting portion 130, and the second guiding inclined surface 132 is connected to the first guiding inclined surfaces 141 and the shaft-received recess 150.

Therefore, when desiring to combine the first connecting member 210 and the key cap 100, with the guidance of the first guiding inclined surfaces 141 and the second guiding inclined surface 132, an assembler is able to push the first pivotal shafts 211 of the first connecting member 210 into the shaft-received recesses 150 of the respective pivot retainers 120, such that the first pivotal shafts 211 of the first connecting member 210 can be engaged with and confined in the respective pivot retainers 120.

It is noted that, when the first pivotal shafts 211 of the first connecting member 210 are pushed into the shaft-received recesses 150 of the respective pivot retainers 120, respectively, since the position-limiting portion 130 interferes with a stroke of the respective first pivotal shafts of the first connecting member 210 into the shaft-received recesses 150, the assembler has to push each of the first pivotal shafts 211 onto one of the second guiding inclined surfaces 132, to make each of the position-limiting portions 130 or the first pivotal shafts 211 elastically deformed by the first pivotal shafts 211 and the second guiding inclined surface 132 that push each other. Thus, thereby enabling the first pivotal shafts 211 of the first connecting member 210 to be pushed into the shaft-received recesses 150 smoothly.

Meanwhile, referring to FIG. 3, when the first connecting member 210 is assembled on the key cap 100, the first end 210A of the first connecting member 210 is directly clamped between the pivot retainers 120, thus further decreasing the possibilities of the first connecting member 210 being unexpectedly removed from the pivot retainers 120.

In the aforementioned embodiment, a slope angle of each of the first guiding inclined surfaces 141 and a slope angle of the second guiding inclined surface 132 is about 40°-45°, respectively, but the disclosure is not limited thereto.

Furthermore, in the embodiment, refer to FIG. 3 and FIG. 4B, the shaft-received recess 150 is directly connected to the bottom surface 112 of the cap body 110 through the pivot retainers 120, that is, each of the pivot retainers 120 is hollow, and a portion of the bottom surface 112 of the cap body 110 can be exposed outwards from the hollow shaft-received recess 150. Therefore, because the contact area of the first pivotal shafts 211 and the pivot retainers 120 is decreased, the degree of abrasion between the first pivotal shafts 211 and the pivot retainers 120 can be lowered so as to prolong the operation life of the first pivotal shafts 211 and the pivot retainers 120. Furthermore, referring to FIG. 4B, each of the lateral portions 140 is concavely formed with a concave cambered surface 142. The concave cambered surfaces face each other, and are respectively connected to the position-limiting portion 130 so as to define the shaft-received recess 150 for receiving one of the first pivotal shafts 211.

Figure 5:
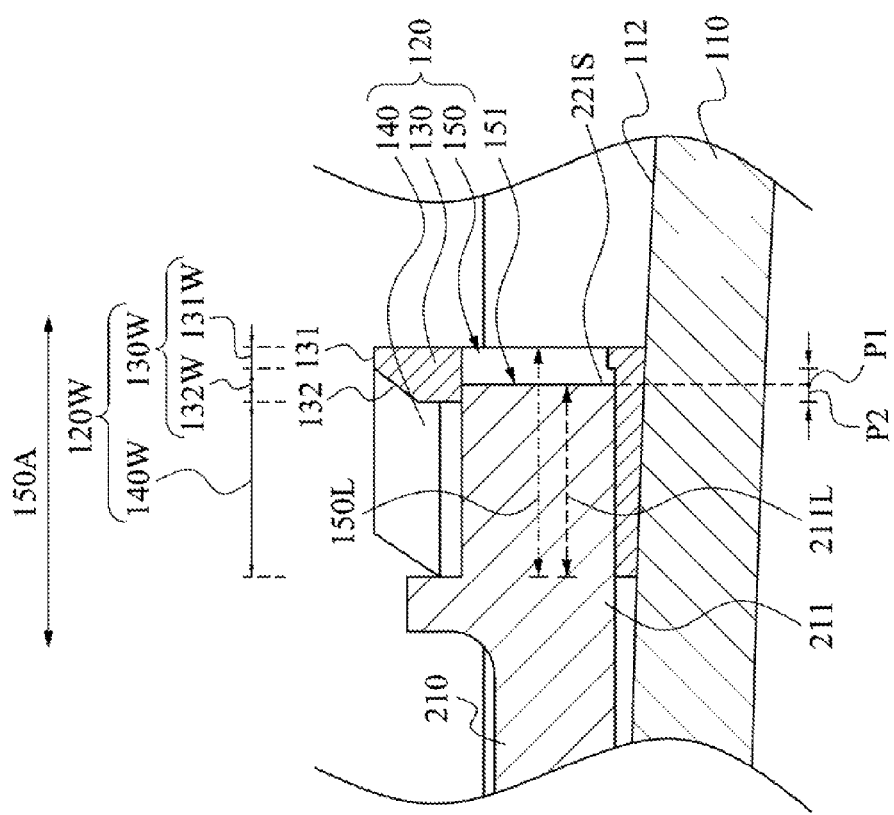
FIG. 5 is a cross-sectional view viewed along line 5-5 of FIGS. 3.

FIG. 5 is a cross-sectional view viewed along line 5-5 of FIG. 3. Referring to FIG. 3 and FIG. 5, the sizes of the pivot retainers 120 provided below are only for illustration, and do not intend to limit the disclosure. In the embodiment, each of the shaft-received recesses 150 is in a shaft shape having a major axis direction 150A. For example, when a maximum length 150L of the shaft-received recess 150 parallel with the major axis 150A is 10 mm, a maximum width 130W of the position-limiting portion 130 parallel with the major axis 150A is 3 mm~3.5 mm, and a maximum width 140W of each of the lateral portions 140 parallel with the major axis 150A is 8 mm. Thus, a ratio of the maximum width 130W of the position-limiting portion 130 to the maximum width 140W of each of the lateral portion is approximate to 3:8. Therefore, because of the position-limiting portion 130, a sufficient coupling strength is provided between the pivot retainers 120 and the respective first pivotal shaft 211 so as to decrease the possibilities of the key cap 100 being unexpectedly separated from the linking mechanism 200.

Furthermore, a width 131W of a top surface 131 of the position-limiting portion 130 opposite to the bottom surface 112 of the cap body 110 is 2 mm, for example. A width 132W of the second guiding inclined surface 132 parallel with the major axis 150A is 1.5 mm, for example. A width 140W of each of the lateral portions 140 parallel with the major axis 150A is 8 mm, for example.

Thus, the width 131W (e.g., 2 mm) of the top surface 131 of the position-limiting portion 130 is ⅕ of a maximum width 120W (i.e., 2 mm+8 mm) of each of the pivot retainers 120. Therefore, compared to the conventional art, the disclosure does not use excessive material, thus avoiding increasing manufacturing cost of the keyboard.

Also, referring to FIG. 3 and FIG. 5, in order to consider enabling the first pivotal shafts 211 to be pressed into the first part 151 of the shaft-received recess 150 and not to be stuck between the pivot retainers 120, each of the first pivotal shafts 211 may be located under the second guiding inclined surface 132. In other words, an orthographic projection P1 of one end surface 211S of the first pivotal shaft 211 onto the cap body 110 is overlapped with an orthographic projection P2 of the second guiding inclined surface 132 onto the cap body 110. Therefore, a length 211L of the first pivotal shaft 211 is greater than a maximum width 140W of each of the lateral portions 140 and smaller than the length 150L of the shaft-received recess 150, that is, the length 211L of the first pivotal shaft 211 ranges between the maximum width 140W of each of the lateral portions 140 and the length 150L of the shaft-received recess 150.

Figure 6:
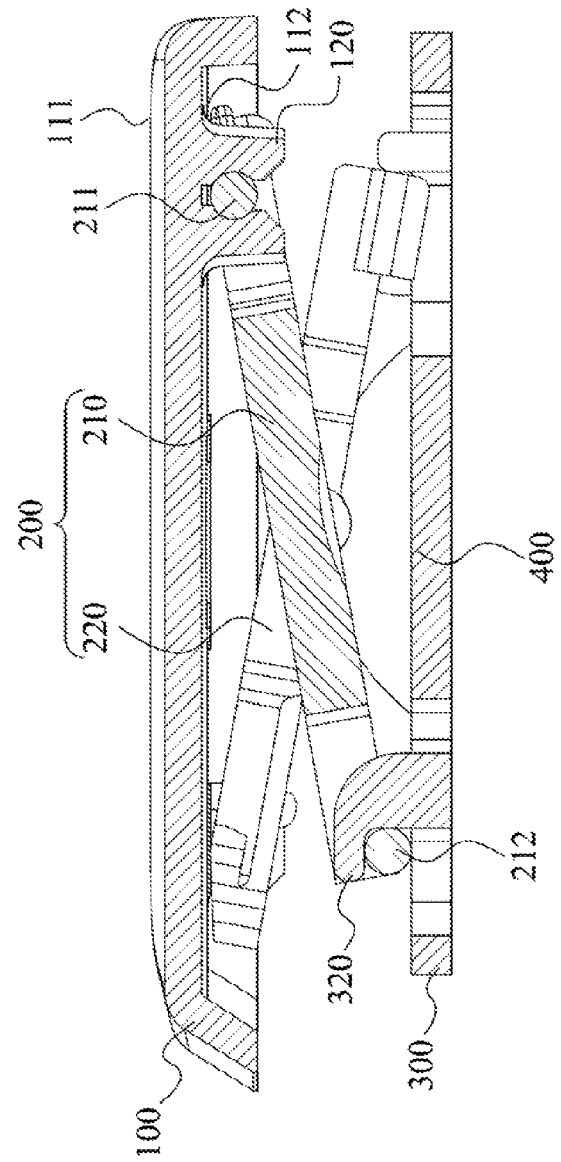
FIG. 6 is a cross-sectional view viewed along line 6-6 of FIG. 1.

FIG. 6 is a cross-sectional view viewed along line 6-6 of FIG. 1. Referring to FIG. 2 and FIG. 6, the first connecting member 210 is provided with pivotal pins 213. The second connecting member 220 is provided with pin bores 223. By engaging the pivotal pins 213 with the pin bores 223, the first connecting member 210 and the second connecting member 220 of the linking mechanism 200 are pivotally connected to each other. Thus, when the linking mechanism 200 is assembled between the base board 300 and the key cap 100, the first connecting member 210 and the second connecting member 220 are intersected. Therefore, as the first connecting member 210 and the second connecting member 220 are relatively rotated, the key cap 100 can be moved upwards and downwards.

Besides, the thin keyboard structure 10 further includes a recovery unit 400. The recovery unit 400 is interposed between the base board 300 and the key cap 100, and two opposite ends of the recovery unit 400 are respectively in contact with the base board 300 and the key cap 100 to return the key cap 100 upward to its previous position before the key cap 100 is pressed.

As long as the key cap can be moved upwards and downwards by the linking mechanism 200, the type of the aforementioned linking mechanism 200 can be a cross-link (scissor) style, a rotary shaft style, a chute-liked style, a "A"

style, a "V" style or alike, but the disclosure is not limited thereto, and other modifications and the use of equivalent structural changes should be included within the scope of the disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A thin keyboard structure, comprising:
    a base board;
    a key cap comprising:
        a cap body having a bottom surface facing towards the base board; and
        at least one pivot retainer protrusively disposed on the bottom surface of the cap body, the pivot retainer comprising a position-limiting portion, two lateral portions and a shaft-received recess, wherein the two lateral portions are respectively located at a same side of the position-limiting portion, and directly connected to the same side of the position-limiting portion, and the shaft-received recess is mutually defined by the position-limiting portion and the two lateral portion, one portion of the shaft-received recess is penetrated through the position-limiting portion, and the other portion of the shaft-received recess is disposed between the two lateral portions; and
    a linking mechanism elevatably connected to the base board and the key cap for guiding the key cap, wherein the linking mechanism is provided with a first connecting member having at least one pivotal shaft at one end of the first connecting member, and the pivotal shaft is pivotally received in the shaft-received recess and is confined by the position-limiting portion.

2. The thin keyboard structure of claim 1, wherein the pivot retainer further comprises:
    two first guiding inclined surfaces that are respectively disposed on the two lateral portions and are connected to the shaft-received recess for guiding the pivotal shaft into the shaft-received recess.

3. The thin keyboard structure of claim 2, wherein the pivot retainer further comprises:
    a second guiding inclined surface that is disposed on the position-limiting portion, and is connected to the two first guiding inclined surfaces and the shaft-received recess,
    wherein, when the first connecting member is engaged with the key cap, the pivotal shaft or the pivot retainer is elastically deformed by the pivotal shaft and the second guiding inclined surface that push each other, such that the pivotal shaft is guided into the shaft-received recess.

4. The thin keyboard structure of claim 3, wherein a slope angle of at least one of the two first guiding inclined surfaces and the second guiding inclined surface is 40° to 45°.

5. The thin keyboard structure of claim 3, wherein an orthographic projection of one end surface of the pivotal shaft onto the cap body is overlapped with an orthographic projection of the second guiding inclined surface onto the cap body.

6. The thin keyboard structure of claim 1, wherein each of the two lateral portions is concavely formed with a concave cambered surface, and the concave cambered surfaces of the two lateral portions face each other, and are respectively connected to the position-limiting portion and defining the other portion of the shaft-received recess.

7. The thin keyboard structure of claim 1, wherein the shaft-received recess is directly connected to the bottom surface of the cap body through the pivot retainer.

8. The thin keyboard structure of claim 1, wherein a length of the pivotal shaft ranges between a width of each of the two lateral portions and a length of the shaft-received recess.

9. The thin keyboard structure of claim 1, wherein a ratio of a width of the position-limiting portion to a width of each of the two lateral portions is approximate to 3:8.

10. The thin keyboard structure of claim 1, wherein the number of the at least one pivotal shaft is two, and the number of the at least one pivot retainer is two, wherein the two pivotal shafts which extend in two opposite directions are both formed on the end of the first connecting member, and the two pivotal shafts respectively extend into the shaft-received recesses of the two pivot retainers, such that the end of the first connecting member is directly clamped between the two pivot retainers.

11. The thin keyboard structure of claim 1, wherein the key cap further comprises at least one sliding slot retainer disposed on the bottom surface of the cap body; and
    the linking mechanism is further provided with a second connecting member having at least one sliding shaft at one end of the second connecting member, and the sliding shaft is slidably received in the sliding slot retainer.

12. The thin keyboard structure of claim 11, wherein the base board is provided with at least one first coupling piece and at least one second coupling piece, the other end of the first connecting member is slidably connected to the first coupling piece, and the other end of the second connecting member is pivotally connected to the second coupling piece.

13. The thin keyboard structure of claim 11, wherein the first connecting member and the second connecting member are pivotally connected to each other.

14. A key cap, comprising:
    a cap body having a bottom surface; and
    at least one pivot retainer protrusively disposed on the bottom surface of the cap body, and the pivot retainer comprising:
        a position-limiting portion;
        two lateral portions respectively located at a same side of the position-limiting portion, and directly connected to the same side of the position-limiting portion; and
        a shaft-received recess mutually defined by the position-limiting portion and the two lateral portions, wherein one portion of the shaft-received recess is penetrated through in the position-limiting portion, and the other portion of the shaft-received recess is disposed between the two lateral portions for receiving and confining a pivotal shaft of a linking mechanism.

15. The key cap of claim 14, wherein the pivot retainer further comprises:
    two first guiding inclined surfaces that are respectively disposed on the two lateral portions, and are connected to the shaft-received recess for guiding the pivotal shaft therein.

16. The key cap of claim 15, wherein the pivot retainer further comprises:
  a second guiding inclined surface that is disposed on the position-limiting portion, and is connected to the two first guiding inclined surfaces and the shaft-received recess,
  wherein, when the linking mechanism is engaged with the key cap, the pivotal shaft or the pivot retainer is elastically deformed by the second guiding inclined surface and the pivotal shaft that push each other, such that the pivotal shaft is guided into the shaft-received recess.

17. The key cap of claim 16, wherein a slope angle of at least one of the two first guiding inclined surfaces and the second guiding inclined surface is 40° to 45°.

18. The key cap of claim 14, wherein a ratio of a width of the position-limiting portion to a width of each of the two lateral portions is approximate to 3:8.

19. The key cap of claim 14, wherein each of the two lateral portions is concavely formed with a concave cambered surface, and the concave cambered surfaces face each other, and are respectively connected to the position-limiting portion so as to define the other part of the shaft-received recess.

20. The key cap of claim 14, wherein the shaft-received recess is directly connected to the bottom surface of the cap body.

21. The key cap of claim 14, wherein the key cap further comprises at least one sliding slot retainer disposed on the bottom surface of the cap body for receiving a sliding shaft of the linking mechanism.

* * * * *